Patented June 2, 1936

2,043,199

UNITED STATES PATENT OFFICE 2,043,199

AZO DYESTUFFS AND THEIR PRODUCTION

Wilhelm Koch and Hermann Winkeler, Ludwigshafen-on-the-Rhine, Germany, assignors to General Aniline Works, Inc., New York, N. Y., a corporation of Delaware No Drawing. Application December 18, 1934, Serial No. 758,142. In Germany October 31, 1933

7 Claims. (Cl. 260—64.5)

The present invention relates to new azo dyestuffs and a process of producing same.

We have found that azo dyestuffs which are capable of being chromed in substance or on the fibre and which have very good properties as regards fastness are obtained by diazotizing compounds, corresponding to the general formula

in which X stands for a radicle of the benzene and naphthalene series, the amino and hydroxyl group standing in ortho-position to each other, and in which X is further substituted by at least one negative substituent, selected from the group consisting of the nitro group and halogen atoms and coupling the said compounds with compounds having the general formula:

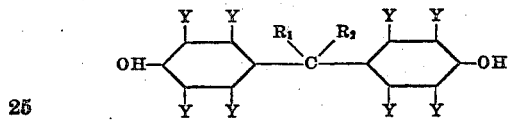

in which $R_1$ and $R_2$ stand for organic radicles selected from the group consisting of aliphatic, and aromatic radicles or for members of a cycloaliphatic ring, and Y stands for hydrogen or a substituent. Suitable diazo components are for example diazo compounds of 1-hydroxy-2-amino-4-nitrobenzene-6-sulphonic acid, 1-hydroxy-2-amino-4-chlorbenzene-6-sulphonic acid, 1-hydroxy-2-amino-4-nitro-6-chlorbenzene, 1-hydroxy-2-amino-4, 6-dinitrobenzene. Suitable coupling components are for example condensation products derived from 1 molecular proportion of a ketone and 2 molecular proportions of a phenol or its derivatives, as follows: beta-beta-di-(4-hydroxy phenyl)-propane, beta-beta-di-(4-hydroxyphenyl)-butane, beta-beta-di-(4-hydroxy-3-sulphophenyl)-propane, beta-beta-di-(4-hydroxy-3-methylphenyl)-propane, beta-beta-(4-hydroxyphenyl)-cyclohexane, beta-beta-di-(4-hydroxyphenyl)-beta-phenyl-ethane. In the said manner monoazo dyestuffs and in some cases disazo dyestuffs may be prepared which in the form of their chromium compounds or by after-chroming on the fibre yield dyeings which are very fast to fulling and washing.

The following examples will further illustrate the nature of this invention but the invention is not restricted to these examples. The parts are by weight.

Example 1

The solution of the diazo compound of 234 parts of 1-hydroxy-2-amino-4-nitrobenzene-6-sulphonic acid, prepared in the usual manner, is allowed to flow into a solution of 250 parts of beta-beta-di-(4-hydroxyphenyl)-propane in a mixture of 5000 parts of water, 100 parts of caustic soda of 40° Bé. strength and 200 parts of sodium carbonate, the whole being stirred until the coupling is completed. The resulting dyestuff is then salted out by the addition of common salt.

The dyeing produced with the dyestuff on wool is subjected to after-chroming whereby brown shades of excellent fastness to light, washing and fulling are obtained. The chromium compound of the dyestuff when prepared in substance dyes wool reddish brown shades of similar excellent fastness.

Example 2

The diazo compound obtained from 223 parts of 1-hydroxy-2-amino-4-chlorbenzene-6-sulphonic acid is coupled in the usual manner with 250 parts of beta-beta-di-(4-hydroxyphenyl)-propane in a solution rendered alkaline with sodium carbonate. The resulting dyestuff yields pale brown shades on wool which change to a brown-violet very fast to washing and fulling by after-chroming.

Example 3

The diazo compound obtained from 188, 5 parts of 1-hydroxy-2-amino-4-nitro-6-chlorbenzene is coupled in the usual manner with 420 parts of beta-beta-di-(4-hydroxy-3-sulphophenyl)-propane in a solution rendered alkaline with sodium carbonate. When the coupling is completed the dyestuff is salted out by the addition of common salt. It dyes wool very uniform brown shades which change to a brown fast to washing, fulling and light by after-treatment with bichromate.

Example 4

The diazo compound obtained from 234 parts of 1-hydroxy-2-amino-4-nitrobenzene-6-sulphonic acid is coupled in the usual manner with 290 parts of 1-di-(4-hydroxyphenyl)-cyclohexane dissolved in a mixture of 10,000 parts of water, 200 parts of caustic soda solution of 40° Bé. strength and 200 parts of sodium carbonate. The dyestuff separated by salting out with common salt in the usual manner yields brown dyeings on wool which change to a brown of excellent fastness by after-chroming.

Example 5

The solution of the compound of 234 parts of 1-hydroxy-2-amino-4-nitrobenzene -6- sulphonic acid, prepared in the usual manner, is allowed to flow into an ice-cooled solution of 280 parts of beta-beta-di-(4-hydroxy-3-methylphenyl) -propane in 5000 parts of water, 150 parts of sodium hydroxide of 40° Bé. and 200 parts of sodium carbonate, the whole being stirred until the coupling is completed. The dyestuff separated by salting out with common salt yields on wool by after-chroming brown shades of good fastness.

Example 6

The diazo compound obtained from 234 parts of 1-hydroxy-2-amino-4-nitrobenzene -6- sulphonic acid is coupled in the usual manner with 260 parts of beta-beta-di-(4-hydroxyphenyl)-butane in a solution rendered alkaline with sodium carbonate. The resulting dyestuff dyes wool by after chroming brown shades of excellent fastness.

Example 7

The solution of the diazo compound of 199 parts of 1-hydroxy-2-amino-4, 6-dinitrobenzene, prepared in the usual manner, is allowed to flow into a solution of 250 parts of beta-beta-di-(4-hydroxyphenyl)-propane in 5000 parts of water, 100 parts of sodium hydroxide of 40° Bé. and 200 parts of sodium carbonate. The coupling is completed after a short time. The azo dyestuff separated by salting out with common salt dyes wool in the single bath chromium process olive-brown shades of good fastness to light and excellent fastness to washing and fulling.

Example 8

The diazo compound obtained from 234 parts of 1-hydroxy-4-nitro-2-aminobenzene -6- sulphonic acid is coupled with 320 parts of beta-beta-di-(4-hydroxyphenyl)-phenyl-ethane in a solution rendered alkaline with sodium carbonate. The dyestuff separated by salting out with common salt dyes wool by after chroming red brown shades of excellent fastness to washing, fulling and finishing.

What we claim is:—

1. The process of producing azo dyestuffs capable of being chromed which comprises diazotizing a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, and coupling the said diazotized compound with a compound having the general formula:

in which R₁ and R₂ stand for organic radicles selected from the group consisting of aliphatic and aromatic radicles or

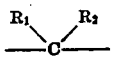

represents a cyclo-aliphatic ring, and one Y in each of the benezene nuclei shown represents a member of the group consisting of hydrogen, a methyl and —SO₃H group, the other Y's being hydrogen.

2. The process of producing azo dyestuffs capable of being chromed which comprises diazotizing a compound corresponding to the general formula:

in which X stands for a radicle of the benzene and naphthalene series, the amino and hydroxyl group standing in ortho-position to each other, and in which X is further substituted by at least one nitro group and at least one halogen atom, and coupling the said diazotized compound with a compound having the general formula:

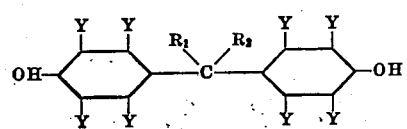

in which R₁ and R₂ stand for organic radicles selected from the group consisting of aliphatic and aromatic radicles or

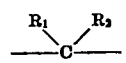

represents a cyclo-aliphatic ring, and one Y in each of the benzene nuclei shown represents a member of the group consisting of hydrogen, a methyl and —SO₃H group, the other Y's being hydrogen.

3. The process of producing azo dyestuffs capable of being chromed which comprises diazotizing a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, and furthermore by at least one sulphonic acid group, and coupling the said diazotized compound with a compound having the general formula:

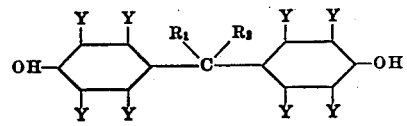

in which R₁ and R₂ stand for organic radicles selected from the group consisting of aliphatic and aromatic radicles or

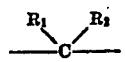

represents a cyclo-aliphatic ring, and one Y in each of the benzene nuclei shown represents a member of the group consisting of hydrogen, a methyl and —SO₃H group, the other Y's being hydrogen.

4. The process of producing azo dyestuffs capable of being chromed which comprises diazotizing a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, and coupling the said diazotized compound with a compound having the general formula:

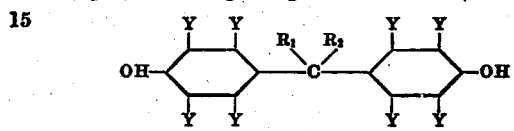

in which $R_1$ and $R_2$ stand for organic radicles selected from the group consisting of aliphatic and aromatic radicles or

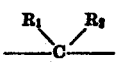

represents a cyclo-aliphatic ring and one Y in each of the benzene nuclei shown stands for the $-SO_3H$ group, the other Y's being hydrogen.

5. Azo dyestuffs, capable of being chromed, of the general formula:

$$(A-N=N-)_n B$$

in which A represents a radicle of the diazo component derived from a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, B represents a radicle of a coupling component having the general formula:

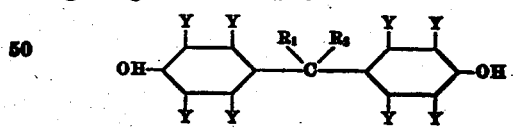

in which $R_1$ and $R_2$ stand for organic radicles selected from the group consisting of aliphatic and aromatic radicles or

represents a cyclo-aliphatic ring, and one Y in each of the benzene nuclei shown represents a member of the group consisting of hydrogen, a methyl and $-SO_3H$ group, the other Y's being hydrogen and $n$ is 1 or 2.

6. Azo dyestuffs, capable of being chromed, of the general formula:

$$(A-N=N-)_n B$$

in which A represents a radicle of the diazo component derived from a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, B represents a radicle of the coupling component having the general formula:

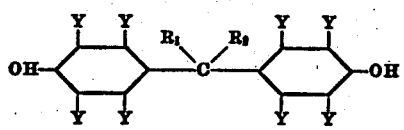

in which $R_1$ and $R_2$ represent organic radicles at least one of which is an aliphatic radicle, and one Y in each of the benzene nuclei shown represents a member of the group consisting of hydrogen, a methyl and $-SO_3H$ group, the other Y's being hydrogen and $n$ is 1 or 2.

7. Azo dyestuffs, capable of being chromed, of the general formula:

$$(A-N=N-)_n B$$

in which A represents a radicle of the diazo component derived from a compound corresponding to the general formula:

in which X stands for a radicle of the benzene and naphthalene series, the amino and hydroxyl group standing in ortho-position to each other, and in which X is further substituted by at least one negative substituent selected from the group consisting of the nitro group and halogen atoms, B represents a radicle of the coupling component having the general formula:

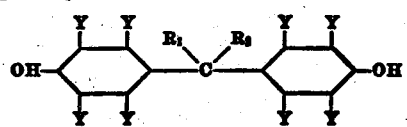

in which $R_1$ and $R_2$ represent organic radicles at least one of which is an aromatic radicle, and one Y in each of the benzene nuclei shown represents a member of the group consisting of hydrogen, a methyl and $-SO_3H$ group, the other Y's being hydrogen and $n$ is 1 or 2.

WILHELM KOCH.
HERMANN WINKELER.